United States Patent [19]
Morlion et al.

[11] Patent Number: 5,828,805
[45] Date of Patent: Oct. 27, 1998

[54] MULTIFIBER CONNECTOR PLUG

[75] Inventors: Danny Morlion, St. Amandsberg; Jan Peter Karel Van Koetsem, Zwijndrecht, both of Belgium

[73] Assignee: Framatome Connectors International, Courbevoie, France

[21] Appl. No.: 837,705

[22] Filed: Apr. 22, 1997

[30]       Foreign Application Priority Data

Apr. 26, 1996 [NL] Netherlands ............................ 1002956

[51] Int. Cl.[6] .................................................. G02B 6/38
[52] U.S. Cl. ................................................ 385/59; 385/71
[58] Field of Search ................................... 385/59, 52, 53, 385/55, 56, 60, 64, 71, 72, 77, 78, 82

[56]             References Cited

U.S. PATENT DOCUMENTS

| 4,253,730 | 3/1981 | Logan et al. | 350/96.21 |
| 4,279,468 | 7/1981 | Turley et al. | 350/96.21 |
| 4,611,887 | 9/1986 | Glover et al. | 350/96.21 |
| 5,214,730 | 5/1993 | Nagasawa et al. | 385/59 |
| 5,619,604 | 4/1997 | Shiflett et al. | 385/59 |

FOREIGN PATENT DOCUMENTS 2062891   5/1981   United Kingdom .

OTHER PUBLICATIONS

Patent Abstracts of Japan, vol. 003, no. 085 (E–124), 1979 & JP, A, 54 061948 (Fujitsu Ltd.) 1979.

*Primary Examiner*—Phan T. H. Palmer
*Attorney, Agent, or Firm*—Perman & Green, LLP

[57]           ABSTRACT

A multifibre connector plug (1) comprises a connector plug part (6) for receiving a plurality of optical fibres (2), a coupling body (10) and a coupling sleeve (19). The connector plug part is provided with a contact face (7) at one end, and is slidable in the coupling body. The connector plug part projects out of said coupling body with its end having the contact face. A corresponding spring means loads the connector plug part in an outward direction. The coupling sleeve (19) encloses the coupling body and is slidable on the coupling body from a coupling position into a decoupling position against the action of a spring means. Both spring means comprise a single common spring (22).

12 Claims, 4 Drawing Sheets

MULTIFIBER CONNECTOR PLUG

BACKGROUND OF THE INVENTION

The invention relates to a multifibre connector plug, comprising a connector plug part for receiving a plurality of optical fibres, said connector plug part having a contact face at one end, a coupling body, the connector plug part being slidable in said coupling body, wherein the connector plug part projects out of said coupling body with its end having said contact face and wherein a corresponding spring means loads the connector plug part in an outward direction, and a coupling sleeve enclosing said coupling body and being slidable on said coupling body from a coupling position into a decoupling position against the action of a spring means.

In the known connector plug of this type several separate spring elements are used making the assembly of the connector plug rather complicated.

SUMMARY OF THE INVENTION

It is an object of the invention to provide an improved multifibre connector plug of the above-mentioned type.

To achieve this object both said spring means in the connector plug according to the invention comprise a single common spring.

In this manner a simplified connector plug is obtained wherein only one spring is required for exerting the required spring force both on the coupling sleeve and the connector plug part.

According to a simple embodiment the spring is accomodated in the coupling body and is received partially compressed between a stop of the coupling sleeve and a stop of the coupling body, wherein the coupling sleeve has at least one lug engaging the connector plug part.

BRIEF DESCRIPTION OF THE DRAWINGS

The invention will be further explained by reference to the drawings in which an embodiment of the connector plug according to the invention is schematically shown.

DETAILED DESCRIPTION OF A PREFERRED EMBODIMENT

Figure 1:
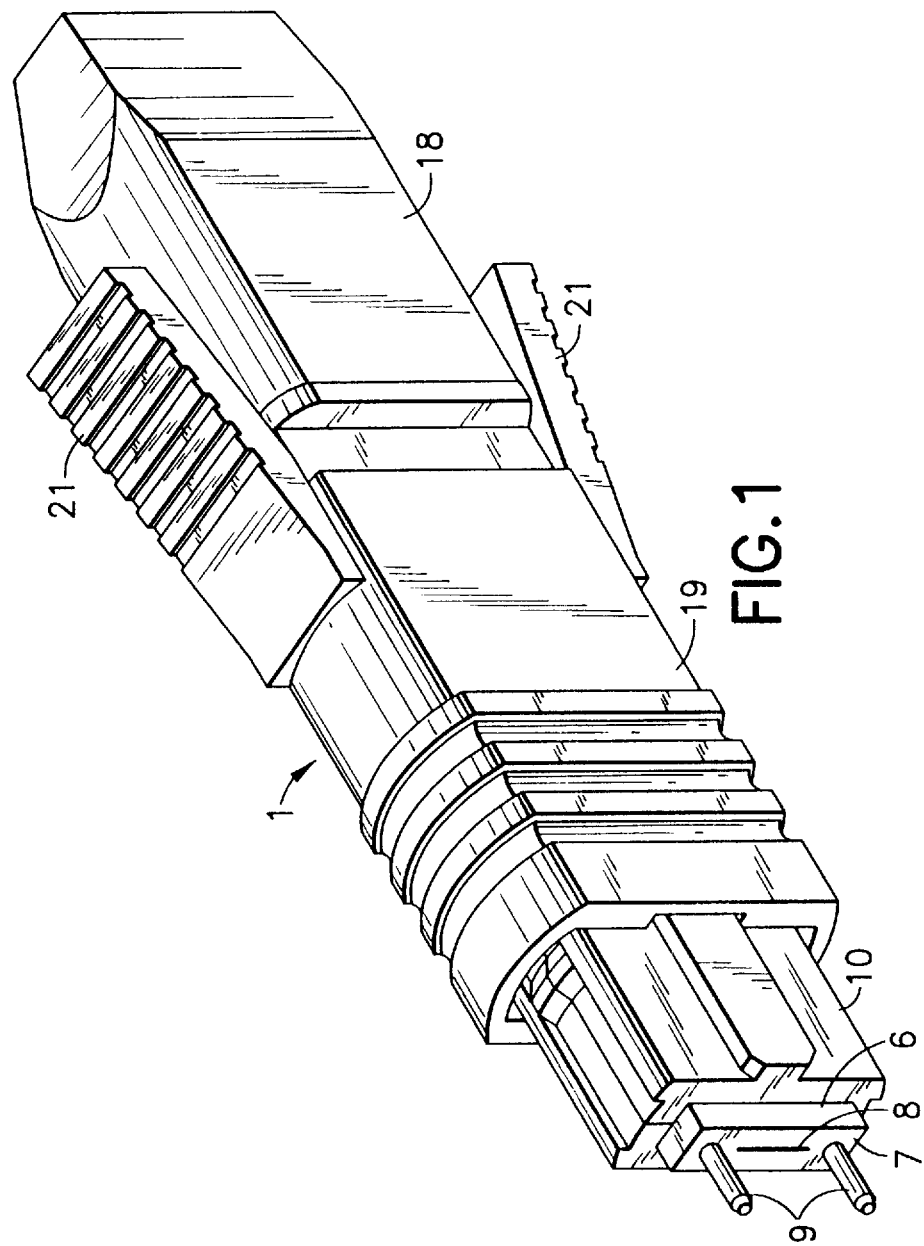
FIG. 1 shows a perspective view of an embodiment of the multifibre connector plug according to the invention, wherein for the sake of clarity the optical fibre cable is not shown.
Figure 2:
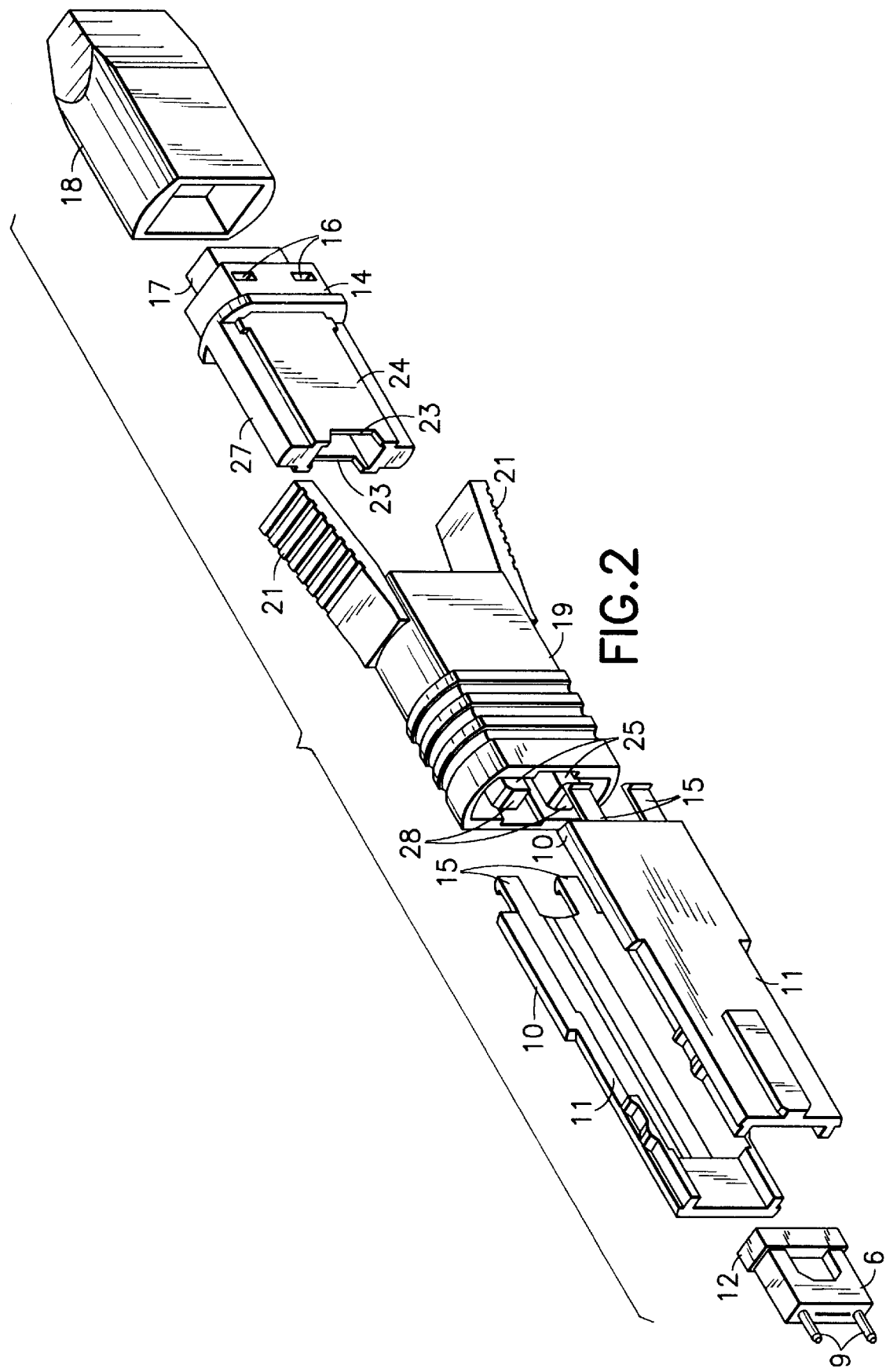
FIG. 2 shows an exploded view of the connector plug of FIG. 1.

Referring to the drawings there is shown a multifibre connector plug 1 which in a manner known per se can be coupled with a corresponding connector plug for interconnecting a plurality of optical fibres. The optical fibres of the connector plug 1 are schematically indicated at 2 in FIG. 4 and are part of an optical fibre cable 3 with an outer jacket 4 and a schematically indicated reinforcement jacket 5 usually made of Kevlar fibres.

The connector plug 1 is provided with a connector plug part 6, in which the uncovered optical fibres 2 are attached. This connector plug part 6 is also indicated as ferrule.

The connector plug part 6 has a contact face 7, the optical fibres 2 ending in said contact face as indicated by reference numeral 8. Further the connector plug part 6 comprises two holes debauching in the contact face 7 at both sides of the ends of the optical fibres 2, wherein in this case guiding pins 9 are mounted in said holes. The pins 9 will be received in the holes of a corresponding connector plug part if the connector plug 1 is coupled with a corresponding connector plug 1.

Figure 3:
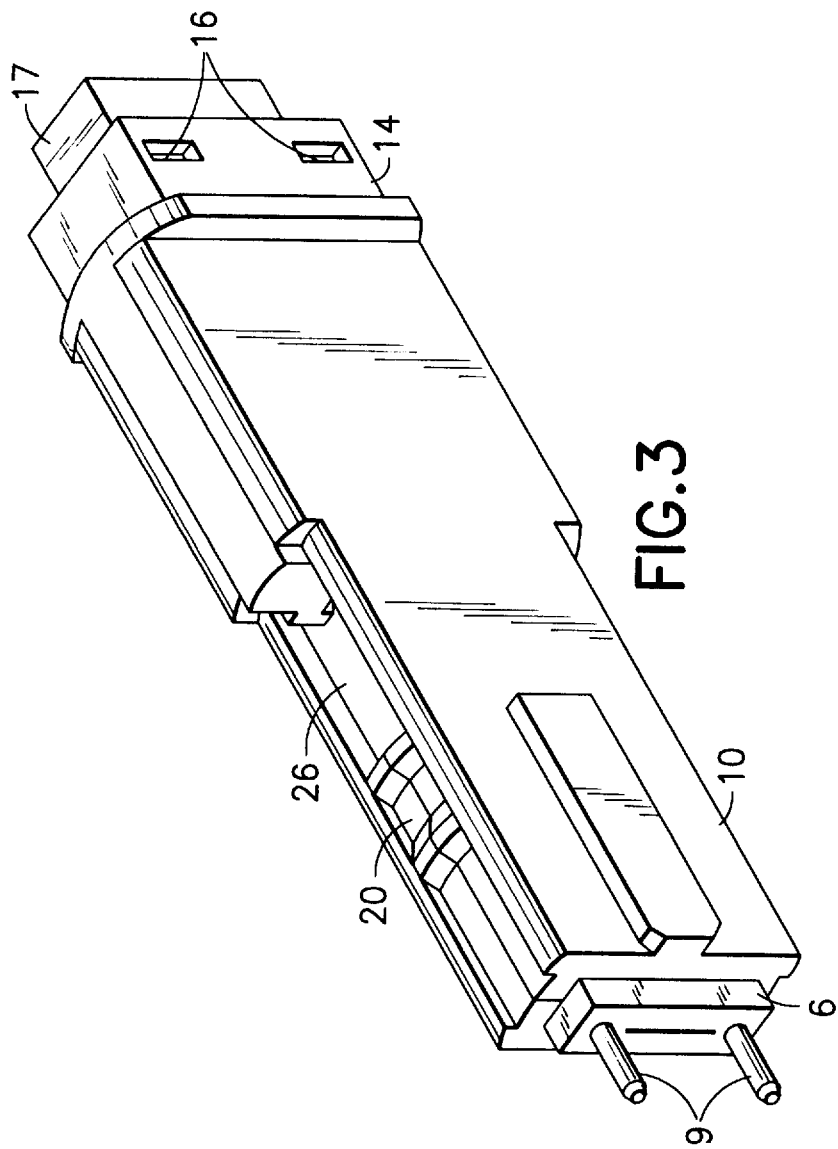
FIG. 3 shows a perspective view of the connector plug of FIG. 1, wherein the coupling sleeve and the end sleeve are deleted.

The connector plug part 6 is slidably received within a coupling body 10 assembled of two identical halves 11, wherein the connector plug part 6 projects out of the coupling body 10 with its end having the contact face 7. As shown in FIG. 3, the connector plug part 6 cannot be pushed out of the coupling body 10, in that an edge 12 of the connector plug part 6 abuts an inner edge 13 of the coupling body 10. As will be explained hereinafter a spring means exerts a spring force on the connector plug part 6 in such a manner that the edge 12 is pressed against the edge 13.

A carrier sleeve 14 is attached on the coupling body 10 by means of four locking fingers 15 engaging into openings 16 of the carrier sleeve 14. The carrier sleeve 14 has at its end opposite of the coupling body 10 a mounting surface 17, the reinforcement jacket 5 of the optical fibre cable 3 being fixed on said surface, for example by glueing.

Finally, the connector plug 1 is closed by an end sleeve or boot 18 attached on the end of the carrier sleeve 14 projecting out of the coupling body 10. The end sleeve 18 encloses the reinforcement jacket 5 of the optical cable 3.

Figure 4:
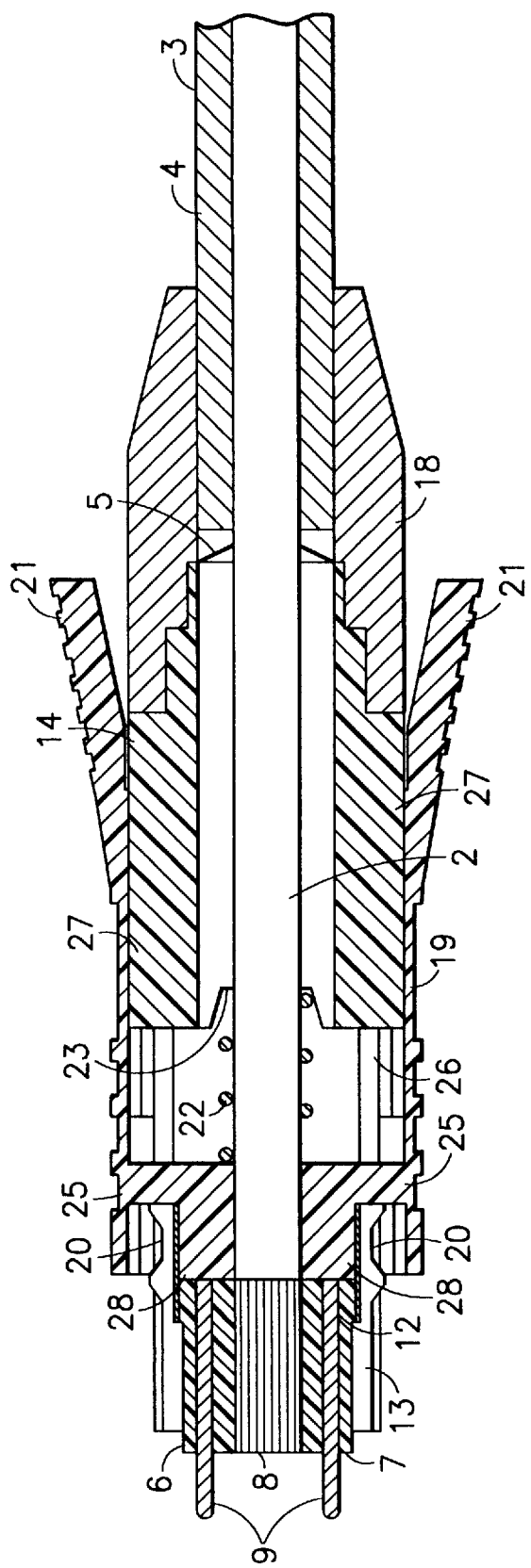
FIG. 4 shows an axial cross-section of the connector plug of FIG. 1 with an optical fibre cable connected thereto.

The connector plug 1 further comprises a coupling sleeve 19 enclosing the coupling body 10 and being slidable on the coupling body 10 from a coupling position shown in FIGS. 1 and 4 into a withdrawn decoupling position not shown. In the coupling position the coupling sleeve 19 encloses two recesses 20 provided in opposite sides of the coupling body 10. In a manner known per se locking fingers of a backpanel adapter, for example, can engage into said recesses to hold the connector plug 1 in the adapter. Decoupling of the connector plug 1 is possible by moving the coupling sleeve 19 into the withdrawn decoupling position against the action of a spring means which after releasing the coupling sleeve 19 moves this coupling sleeve back into the coupling position. To facilitate the operation of the coupling sleeve 19 operating lips 21 are provided at two opposite sides, said lips 21 extending obliquely outwardly in the direction of the end sleeve 18.

In the connector plug 1 shown the above-mentioned spring means are formed by a spring 22 accommodated in the interior of the coupling body 10 and pressing the coupling sleeve 19 into the coupling position shown. The spring 22 is received between the end edges 23 of two opposite side walls 24 of the carrier sleeve 14 and backfaces of L-shaped lugs 25 of the coupling sleeve 19. These L-shaped lugs 25 project into the interior of the coupling body 10 through slots 26 formed in opposite side walls of the coupling body 10. These slots 26 are open at the end directed away from the connector plug part 6.

The carrier sleeve 14 is provided with an elongated lug 27 at two opposite side walls, each lug 27 being received in a corresponding slot 26 when the carrier sleeve 14 is mounted on the coupling body 10.

The L-shaped lugs 25 each have a leg 28 directed in axial direction towards the connector plug part 6 and having a front face engaging this connector plug part 6. In this manner the spring force of the spring 22 is also exerted on the connector plug part 6.

The connector plug 1 described shows the advantage that only one spring is required for exerting the necessary spring force both on the coupling sleeve 19 and the connector plug part 6, so that manufacturing and assembly of the connector plug 1 is relatively simple. As the coupling body 10 comprises two halves 11, manufacturing is further simplified.

The invention is not restricted to the above-described embodiment which can be varied in a number of ways within the scope of the invention.

What is claimed is:

1. A multifibre connector plug, comprising a connector plug part for receiving a plurality of optical fibres, said connector plug part having a contact face at one end, a coupling body, the connector plug part being sidable in said coupling body, wherein the connector plug part projects out of said coupling body with its end having said contact face, a coupling sleeve enclosing said coupling body and being sidable on said coupling body from a coupling position into a decoupling position, and a single common spring extending between and in engagement with the coupling sleeve and the coupling body for biasing the coupling sleeve and the connector plug part in the direction of the contact face.

2. A connector plug according to claim 1, wherein the spring is accomodated in the coupling body and is received partially compressed between a stop of the coupling sleeve and a stop of the coupling body, wherein the coupling sleeve has at least one lug engaging the connector plug part.

3. A connector plug according to claim 2, wherein the coupling body has a slot at two opposite sides and the coupling sleeve at two opposite sides carries lugs directed towards each other and projecting into the interior of the coupling body through said slots, wherein the lugs with their front faces engage the connector plug part and their backfaces directed away from the connector plug part form the stop for the spring.

4. A connector plug according to claim 3, wherein the slots of the coupling body are open at the end opposite the connector plug part, wherein a carrier sleeve is connected to the coupling body at said end, said carrier sleeve at two opposite sides having a lug fittingly received in a corresponding slot of the coupling body.

5. A connector plug according to claim 4, wherein the carrier sleeve at the end opposite the coupling body has a mounting surface for a reinforcement jacket of an optical cable comprising said optical fibres, wherein a boot is fixed on said end while clamping the reinforcement jacket.

6. A connector plug according to claim 4, wherein the stop of the coupling body is formed by end edges of two opposite side walls of the carrier sleeve.

7. A connector plug according to claim 2, wherein said lugs of the coupling sleeve each have a substantially L-shaped cross-section, wherein one leg of each L-shaped lug is directed in axial direction towards the connector plug part.

8. A connector plug according to claim 7, wherein the slots of the coupling body are open at the end opposite the connector plug part, wherein a carrier sleeve is connected to the coupling body at said end, said carrier sleeve at two opposite sides having a lug fittingly received in a corresponding slot of the coupling body.

9. A connector plug according to claim 8, wherein the stop of the coupling body is formed by end edges of two opposite side walls of the carrier sleeve.

10. A connector plug according to claim 8, wherein the carrier sleeve at the end opposite the coupling body has a mounting surface for a reinforcement jacket of an optical cable comprising said optical fibres, wherein a boot is fixed on said end while clamping the reinforcement jacket.

11. A connector plug according to claim 1, wherein the coupling body comprises two identical halves.

12. A connector plug according to claim 1, wherein the coupling sleeve at two opposite sides comprises obliquely outwardly extending operating lips.

\* \* \* \* \*